(12) United States Patent
Niemi et al.

(10) Patent No.: US 10,893,413 B2
(45) Date of Patent: Jan. 12, 2021

(54) USER EQUIPMENT KEY DERIVATION AT MOBILITY UPDATE IN MOBILE COMMUNICATIONS

(71) Applicant: MediaTek Singapore Pte. Ltd., Singapore (SG)

(72) Inventors: Marko Niemi, Oulu (FI); Jarkko Eskelinen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/655,230

(22) Filed: Oct. 17, 2019

(65) Prior Publication Data

US 2020/0128402 A1 Apr. 23, 2020

Related U.S. Application Data

(60) Provisional application No. 62/746,584, filed on Oct. 17, 2018.

(51) Int. Cl.
*H04W 4/00* (2018.01)
*H04W 12/04* (2009.01)
(Continued)

(52) U.S. Cl.
CPC ........ *H04W 12/0401* (2019.01); *H04W 8/02* (2013.01); *H04W 36/0038* (2013.01); *H04W 60/005* (2013.01)

(58) Field of Classification Search
None
See application file for complete search history.

(56) References Cited

U.S. PATENT DOCUMENTS

2019/0223063 A1\* 7/2019 Palanigounder .. H04W 12/0401
2020/0053828 A1\* 2/2020 Bharatia ............. H04W 68/005
(Continued)

FOREIGN PATENT DOCUMENTS

CN 101299884 A 11/2008
WO WO 2018137853 A1 8/2018

OTHER PUBLICATIONS

China National Intellectual Property Administration, International Search Report and Written Opinion for PCT/CN2019/111653, dated Jan. 6, 2020.

(Continued)

*Primary Examiner* — Erika A Washington
(74) *Attorney, Agent, or Firm* — Han IP PLLC; Andy M. Han (57) ABSTRACT

Examples pertaining to user equipment (UE) key derivation at mobility update in mobile communications are described. An apparatus implemented in a UE conducts a registration with a first Access and Mobility Management Function (AMF) of a network. The apparatus also conducts one other registration with a second AMF of the network over a $3^{rd}$ Generation Partnership Project (3 GPP) access. In response, the apparatus receives a request from the second AMF over the 3 GPP access. The apparatus then performs a key derivation to generate a derived key using a keying material from the initial registration with the first AMF to result in the UE and the second AMF sharing a common security context for the 3 GPP access and a non-3 GPP access.

20 Claims, 6 Drawing Sheets

(51) Int. Cl.
*H04W 8/02* (2009.01)
*H04W 60/00* (2009.01)
*H04W 36/00* (2009.01)

(56) References Cited

U.S. PATENT DOCUMENTS

2020/0084663 A1\* 3/2020 Park ................. H04W 80/02
2020/0084676 A1\* 3/2020 Ben Henda ....... H04W 12/0401

OTHER PUBLICATIONS

Ericsson, Evaluation of SA3 LS S3-182637, 3GPP TSG-CT WG1 Meeting #112bis, C1-186513, Vilnius, Lithuania, Oct. 15-19, 2018.
Huawei et al., Clafication on retrievial of the security content from old AMF, 3GPP TSG-WG2 Meeting #128, S2-186937, Vilnius, Lithuania, Jul. 2-6, 2018.
Huawei et al., KAMF Derivation when AMF set changes, 3GPP TSG SA WG3 (Security) Meeting #89, S3-173238, Reno, USA, Nov. 27-Dec. 1, 2017.

\* cited by examiner

USER EQUIPMENT KEY DERIVATION AT MOBILITY UPDATE IN MOBILE COMMUNICATIONS

CROSS REFERENCE TO RELATED PATENT APPLICATION(S)

The present disclosure is part of a non-provisional application claiming the priority benefit of U.S. Patent Application No. 62/746,584, filed on 17 Oct. 2018. The content of aforementioned application is herein incorporated by reference in its entirety.

TECHNICAL FIELD

The present disclosure is generally related to mobile communications and, more particularly, to user equipment (UE) key derivation at mobility update in mobile communications.

BACKGROUND

Unless otherwise indicated herein, approaches described in this section are not prior art to the claims listed below and are not admitted as prior art by inclusion in this section.

The $3^{rd}$ Generation Partnership Project (3GPP) technical specification (TS) 33.501 species that an Access and Mobility management Function (AMF) of a 5G mobile network and a UE shall establish a common Non-Access Stratum (NAS) security context consisting of a single set of NAS keys and algorithm at the time of first registration over any access, whether 3GPP access or non-3GPP access. The AMF and the UE shall also include parameters specific to each NAS connection in the common NAS security context.

The security group in 3GPP is currently working on the security of being registered on both 3GPP access and non-3GPP access in the same Public Land Mobile Network (PLMN). It has been found that there are possible scenarios of 3GPP mobility that can cause the UE and AMF to not share a common security context for the non-3GPP access. For example, it is possible that the UE is registered over the non-3GPP access and then registers over the 3GPP access to a new AMF. There is, therefore, a need to address issues arising from such possible scenarios.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus implemented in a UE conducting an initial registration with a first AMF of a network. The method may also involve the processor conducting a subsequent registration with a second AMF of the network over a 3GPP access. The method may further involve the processor receiving a request from the second AMF over the 3GPP access. The method may additionally involve the processor performing a key derivation to generate a derived key (K'AMF) using a keying material from the initial registration with the first AMF to result in the UE and the second AMF sharing a common security context for the 3GPP access and a non-3GPP access.

In one aspect, a method may involve a processor of an apparatus implemented in a UE conducting a registration with a second AMF of a network over a 3GPP access. The method may also involve the processor performing a key derivation to generate a derived key ($K'_{AMF}$) using a keying material from an initial registration with a first AMF to result in the UE and the second AMF sharing a common security context for the 3GPP access and a non-3GPP access.

In one aspect, an apparatus may include a transceiver and a processor coupled to the transceiver. The transceiver may, during operation, wirelessly communicate with a communication entity (e.g., gNB) of a 5th Generation (5G) New Radio (NR) mobile network. The processor may be configured to conduct, via the transceiver, a registration with a second AMF of a network over a 3GPP access. The processor may be also configured to perform a key derivation to generate a derived key ($K'_{AMF}$) using a keying material from an initial registration with a first AMF to result in the UE and the second AMF sharing a common security context for the 3GPP access and a non-3GPP access.

It is noteworthy that, although description provided herein may be in the context of certain radio access technologies, networks and network topologies such as 5G/NR mobile networking, the proposed concepts, schemes and any variation(s)/derivative(s) thereof may be implemented in, for and by other types of radio access technologies, networks and network topologies such as, for example and without limitation, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UE key derivation at mobility update in mobile communications. According to the present disclosure, a number of possible solutions may be implemented separately or jointly. That is, although these possible solutions may be described below separately, two or more of these possible solutions may be implemented in one combination or another.

Figure 1:
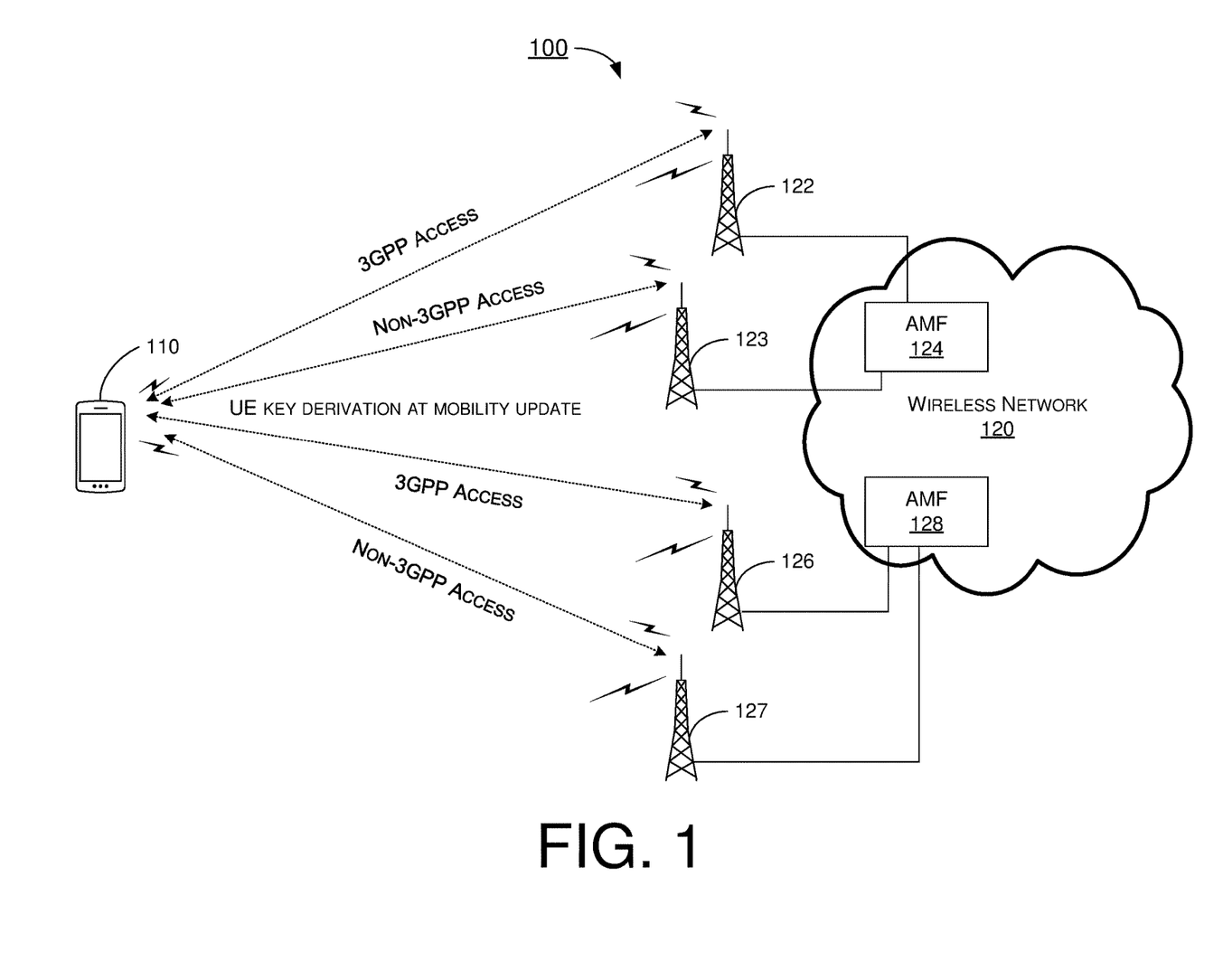
FIG. 1 is a diagram of an example network environment in which various solutions and schemes in accordance with the present disclosure may be implemented.
Figure 2:
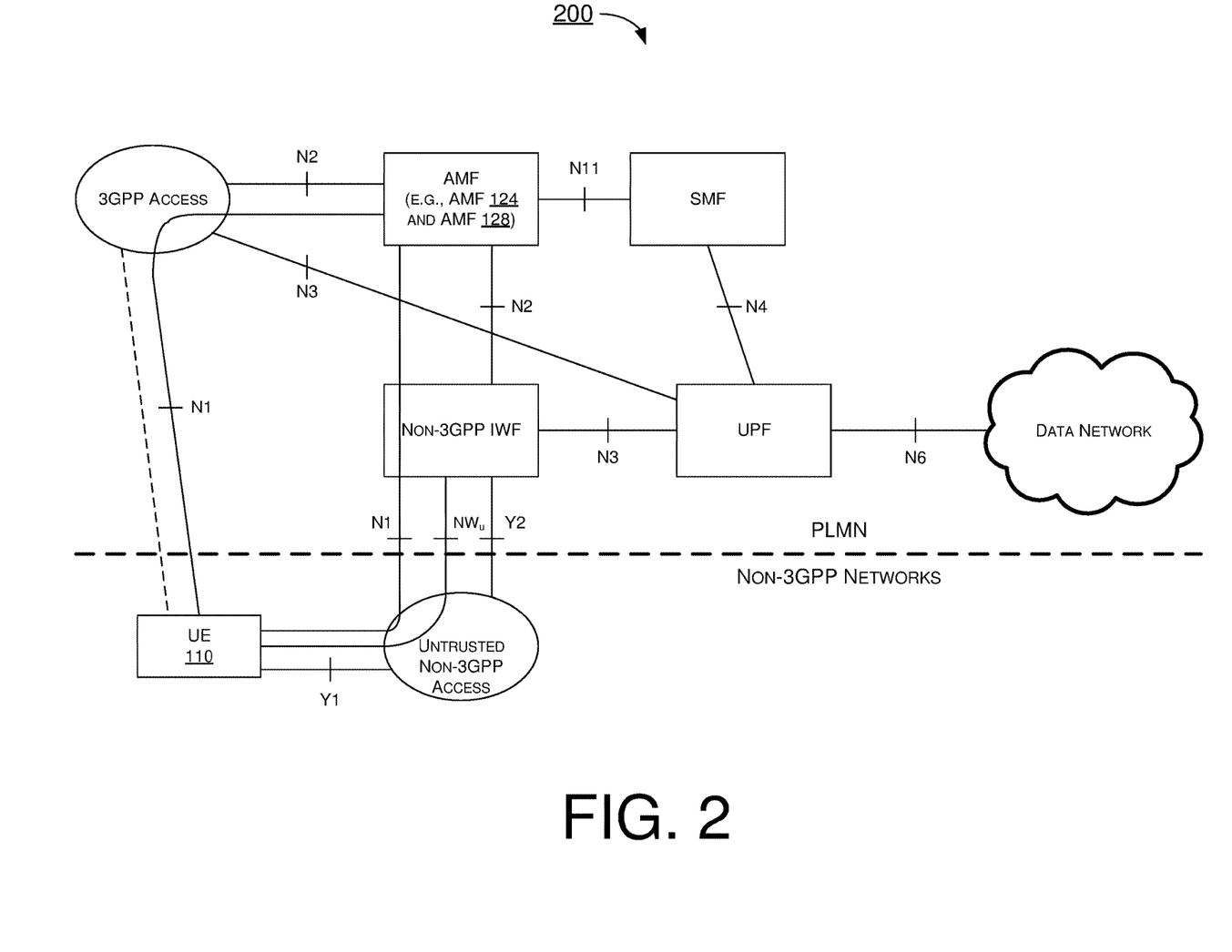
FIG. 2 shows an example functional diagram of the network environment of FIG. 1.
Figure 3:
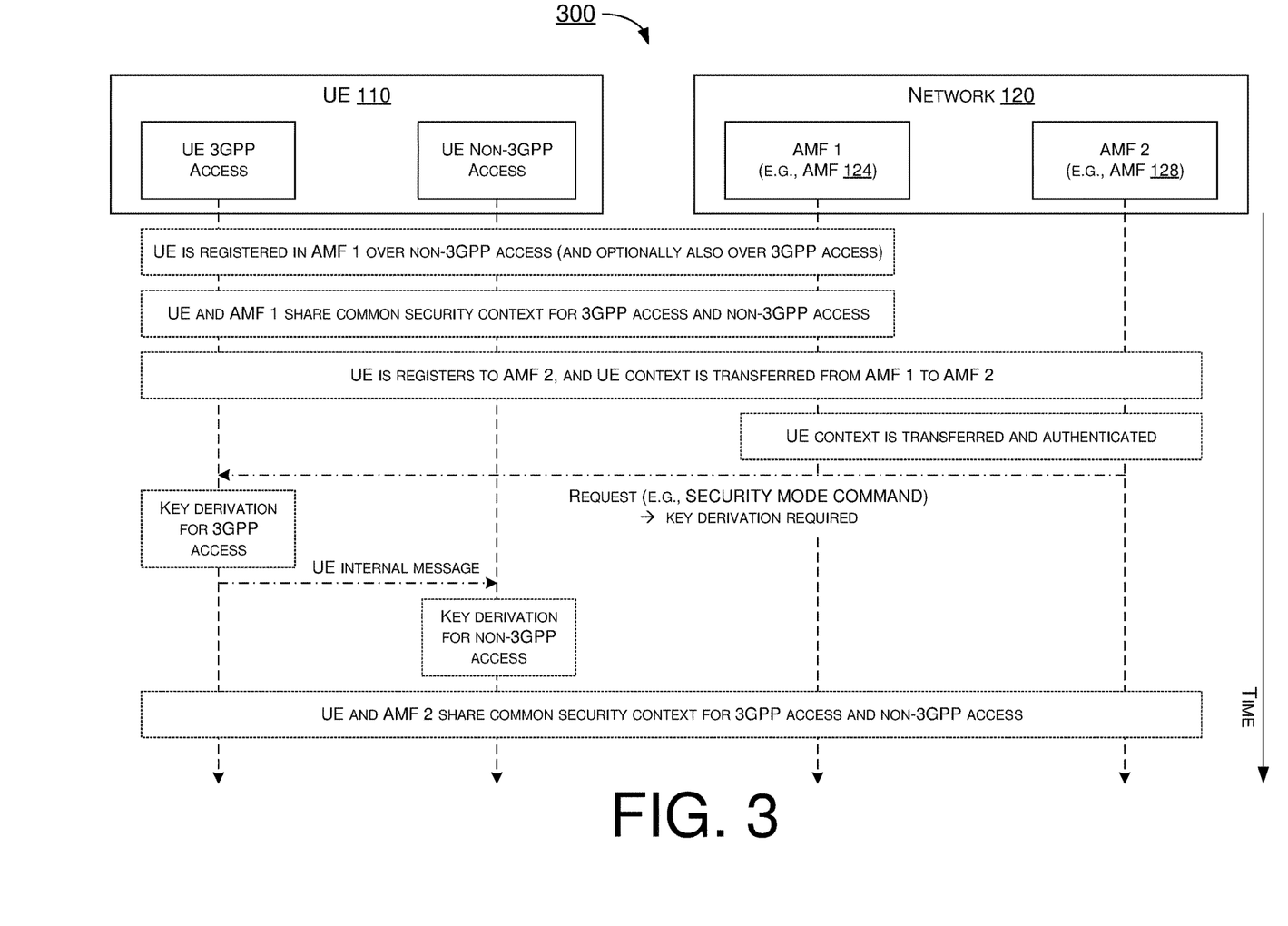
FIG. 3 shows a table of an example scenario in accordance with an implementation of the present disclosure.

FIG. 1 illustrates an example network environment 100 in which various solutions and schemes in accordance with the present disclosure may be implemented. FIG. 2 illustrates an example functional diagram 200 of network environment 100 of FIG. 1. FIG. 3 illustrates example scenario 300 in accordance with implementations of the present disclosure. Scenario 300 may be implemented in network environment 100. The following description of various proposed schemes is provided with reference to FIG. 1~FIG. 3.

Referring to FIG. 1, network environment 100 may involve a UE 110 in wireless communication with a wireless network 120 (e.g., a 5G NR mobile network). UE 110 may initially be in wireless communication with wireless network 120 over a 3GPP access via a first base station or network node 122 (e.g., a gNB or transmit-receive point (TRP)) and/or over a non-3GPP access via a second base station or network node 123 (e.g., an eNB), with connection and mobility management tasks handled by a first AMF 124. UE 110 may subsequently move to an area in cellular coverage of and in wireless communication over a 3GPP access with a third base station or network node 126 (e.g., a gNB or TRP) and/or over a non-3GPP access with a fourth base station or network node 127 (e.g., eNB), with connection and mobility management tasks handled by a second AMF 128. Referring to FIG. 2, most of the functions performed in wireless network 120 are shown on the side of a Public Land Mobile Network (PLMN), and a Non-3GPP InterWorking Function (N3IWF) may be inside wireless network 120. The N3IWF may be connected to both AMF 124 and AMF 128 inside wireless network 120. The non-3GPP access, which is untrusted, is connected to a 5G Core (5GC) network (e.g., wireless network 120) via the N3IWF that is connected to the AFM over an N2 interface, which is essentially the same interface as that between network nodes 122/123 and AMF 124 and between network nodes 126/127 and AMF 128. The non-3GPP access is connected to the same AMF (AMF 124 or AMF 128) as the corresponding 3GPP access when in the same PLMN/same wireless network. In network environment 100, UE 110 and wireless network 120 may implement various schemes pertaining to UE key derivation at mobility update in mobile communications in accordance with the present disclosure, as described herein.

Under the current 3GPP specification (TS 33.501), in a scenario that 3GPP access is moved to a new AMF, it is possible that the security context for the non-3GPP access becomes de-synchronized between the UE and the AMF (e.g., with the source or old AMF performing a $K_{AMF}$ key derivation as described in clause 6.9.3 of TS 33.501). The AMF would be aware of such a problem. There are several possible approaches to addressing this issue. In a first approach, the AMF can change both the 3GPP and non-3GPP access security context at the same time in NAS security mode control procedure, triggered by SECURITY MODE COMMAND message or NAS transparent container (NASC) signaling. Intra N1 mode NAS transparent container is used during connected mode AMF-AMF handover procedure, while SECURITY MODE COMMAND is used in idle mode mobility between two AMFs (e.g., AMF 124 and AMF 128), after UE 110 performs a MOBILITY REGISTRATION UPDATE (MRU) procedure. In a second approach, the AMF can change the non-3GPP access security context to the same as the 3GPP security context using an indication in a Registration Accept message on the 3GPP access. In a third approach, the AMF can signal to the UE in the Registration Accept message on the 3GPP access that there is a security context issue (e.g., that security context has become out of synchronization) on the non-3GPP access to trigger the UE to perform a registration over the non-3GPP access. As part of this registration process, the AMF can send a NAS SMC. In a fourth approach, the UE can perform a registration over the non-3GPP access when the UE is aware of the possible de-synchronization. As part of this registration process, the AMF can send a NAS SMC. In a fifth approach, the AMF can decide to take no action and let the current signaling sort out the issue by failing a Service Request from the UE. It is noteworthy that, the new AMF and the old AMF can transfer UE security context and authenticate the data. When the old AMF and the new AMF have successfully authenticated the data, the new AMF can indicate that the UE is validated. In other words, for UE security context transfer between the AMFs, UE involvement is not needed.

However, none of the aforementioned approaches solves the issue of key derivation being required also for the non-3GPP access. Besides, all of the aforementioned approaches are not optimal as they require additional signaling between AMFs and the UE.

Under a proposed scheme in accordance with the present disclosure, when the 3GPP access is moved due to mobility (e.g., UE 110 moving to a different location) or when UE 110 conducts initial registration to second AMF 128 (as a new AMF), and UE 110 is required to perform key derivation for the 3GPP access, while UE 110 is registered to first AMF 124 (as an old AMF) over both or other type(s) of access (e.g., 3GPP and non-3GPP) on the same PLMN (with UE 110 having a "common security context" and same ngKSI), UE 110 may locally perform key derivation for the 3GPP access and also for the non-3GPP access to use the derived key in the next initial message.

Referring to FIG. 3, in scenario 300, UE 110 may be registered over non-3GPP access to an old AMF (denoted as "AMF 1"), e.g., AMF 124. UE 110 may be registered over the 3GPP access to AMF 1 or may be unregistered. Then, UE 110 may conduct an initial registration over the 3GPP access with a new AMF (denoted as "AMF 2"), e.g., AMF 128, which is not in use for non-3GPP access. Alternatively, UE 110 may be registered to AMF 1 over the 3GPP access and move, due to mobility or other reason(s), to an area covered by AMF 2 and perform a MOBILITY AND PERIODIC REGISTRATION procedure. For instance, UE 110 may use "common security context" from AMF 1 to integrity protect an initial NAS message to AMF 2 (e.g., a MOBILITY AND PERIODIC REGISTRATION REQUEST or A REGISTRATION REQUEST). UE 110 may use a Globally Unique Temporary Identity (GUTI) from AMF 1 when sending the initial NAS message to AMF 2, so that AMF 2 may be aware that UE 110 does have established security context.

Upon registration by UE 110, AMF 2 may notice that the 3GPP access of UE 110 is using GUTI of AMF 1 and, thus, AMF 2 may request context transfer from AMF 1, including security context. The context transfer may move non-3GPP access to use AMF 2 with a separate procedure that is not in the scope of the present disclosure and thus is not described herein.

When UE 110 can be identified, AMF 2 may use an SMC procedure over the 3GPP access to request UE 110 to perform a horizontal key derivation (e.g., derive $K'_{AMF}$ locally for 3GPP access and non-3GPP access) based on current security context. Under the proposed scheme, the key derivation may be performed using keying material from initial registration to AMF 1. In an event that UE 110 had "common security context" in use for 3GPP access and non-3GPP access, an indication from AMF 2 over the 3GPP access that key derivation for the context is required may initiate or otherwise trigger UE 110 to perform key derivation also for the non-3GPP access. As a result, UE 110 and AMF 2 may share common security context for both the 3GPP access and the non-3GPP access. As a general comment on key derivation and key hierarchy, it is noteworthy that both non-3GPP access and 3GPP access use the same $K_{AMF}$ to derive access-specific keys such as $K_{n3iwf}$, $K_{nasint}$, $K_{nasenc}$, $K_{ng}$, and so on. Under the proposed schemes, the derived key $K'_{AMF}$ is used by AMF 2 and UE 110.

Illustrative Implementations

Figure 4:
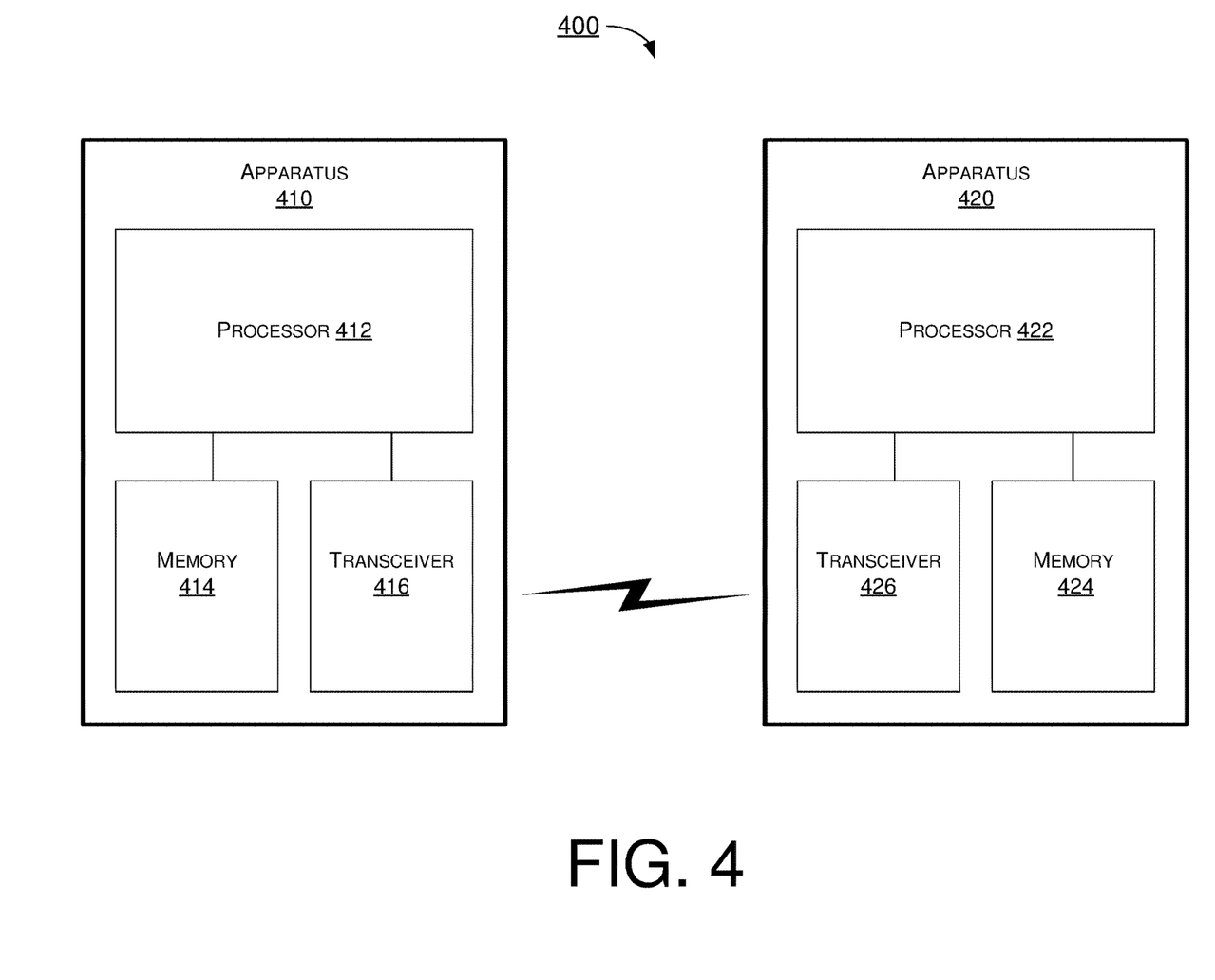
FIG. 4 is a block diagram of an example communication system in accordance with an implementation of the present disclosure.

FIG. 4 illustrates an example communication system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to UE key derivation at mobility update in mobile communications, including the various schemes described above with respect to various proposed designs, concepts, schemes, systems and methods described above, including network environment 100, as well as processes described below.

Each of apparatus 410 and apparatus 420 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 410 and apparatus 420 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to UE key derivation at mobility update in mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE (e.g., UE 110), and apparatus 420, as a network node (e.g., network node 122 or network node 126) of a wireless network (e.g., wireless network 120 as a 5G/NR mobile network), is provided below.

In one aspect of UE key derivation at mobility update in mobile communications in accordance with the present disclosure, processor 412 of apparatus 410, implemented in or as UE 110, may conduct, via transceiver 416, a registration with a first AMF of a network (e.g., AMF 124 of wireless network 120 as AMF 1 in network environment 100 and scenario 200). Additionally, processor 412 may conduct, via transceiver 416, a registration with a second AMF of the network (e.g., AMF 128 of wireless network 120 as AMF 2 in network environment 100 and scenario 200) over a 3GPP access. Moreover, processor 412 may receive, via transceiver 416, a request from the second AMF over the 3GPP access. Furthermore, processor 412 may perform a key derivation to generate a derived key ($K'_{AMF}$) using a keying material from the registration with the first AMF to result in apparatus 410 and the second AMF sharing a common security context for the 3GPP access and a non-3GPP access.

In some implementations, in performing the key derivation, processor 412 may derive the $K'_{AMF}$ for the 3GPP access and for the non-3GPP access with respect to the second AMF based on a current security context.

In some implementations, in receiving the request, processor 412 may receive a SECURITY MODE COMMAND message indicating that the key derivation is required. In an event that UE 110 used a common security context for the 3GPP access and the non-3GPP access with the first AMF, in performing the key derivation, processor 412 may derive the $K'_{AMF}$.

In some implementations, in conducting the registration with the first AMF, processor 412 may register to the first AMF over at least one of the 3GPP access and the non-3GPP access.

In some implementations, in conducting the registration with the second AMF, processor 412 may register to the second AMF over the 3GPP access.

In some implementations, in conducting the registration with the second AMF, apparatus 410 may perform certain operations. For instance, apparatus 410 may move from a first location associated with the first AMF to a second location associated with the second AMF. Additionally, processor 412 may perform a MOBILITY REGISTRATION procedure.

In some implementations, in performing the MOBILITY REGISTRATION procedure, processor 412 may perform certain operations. For instance, processor 412 may perform, using a common security context from the first AMF, integrity protection of an initial NAS message for the second AMF. Moreover, processor 412 may transmit, via transceiver 416, the NAS message to the second AMF using a GUTI of UE 110 from the first AMF.

In one aspect of UE key derivation at mobility update in mobile communications in accordance with the present disclosure, processor 412 of apparatus 410, implemented in or as UE 110, may conduct, via transceiver 416, a registration with a second AMF of a network (e.g., AMF 128 of wireless network 120 as AMF 2 in network environment 100 and scenario 300) over a 3GPP access. Moreover, processor 412 may perform a key derivation to generate a derived key ($K'_{AMF}$) using a keying material from an initial registration with a first AMF (e.g., AMF 124 of wireless network 120 as AMF 1 in network environment 100 and scenario 300) to result in UE 110 and the second AMF sharing a common security context for the 3GPP access and a non-3GPP access.

In some implementations, in performing the key derivation, processor 412 may derive the $K'_{AMF}$ for the 3GPP access and for the non-3GPP access with respect to the second AMF In some implementations, in performing the key derivation, processor 412 may perform certain operations. For instance, processor 412 may receive, via transceiver 416, a request from the second AMF over the 3GPP access. Additionally, processor 412 may perform the key derivation responsive to receiving the request. In some implementations, in receiving the request, processor 412 may receive a SECURITY MODE COMMAND message indicating that the key derivation is required. In an event that UE 110 used a common security context for the 3GPP access and the non-3GPP access with the first AMF, in performing the key derivation, processor 412 may derive the $K'_{AMF}$ to be used with the second AMF.

In some implementations, in conducting the registration with the second AMF, apparatus 410 may perform certain operations. For instance, apparatus 410 may move from a first location associated with the first AMF to a second location associated with the second AMF. Moreover, processor 412 may perform a MOBILITY REGISTRATION procedure.

In some implementations, in performing the MOBILITY REGISTRATION procedure, processor 412 may perform certain operations. For instance, processor 412 may perform, using a common security context from the first AMF, integrity protection of an initial NAS message for the second AMF. Additionally, processor 412 may transmit, via transceiver 416, the NAS message to the second AMF using a GUTI of UE 110 from the first AMF.

Illustrative Processes

Figure 5:
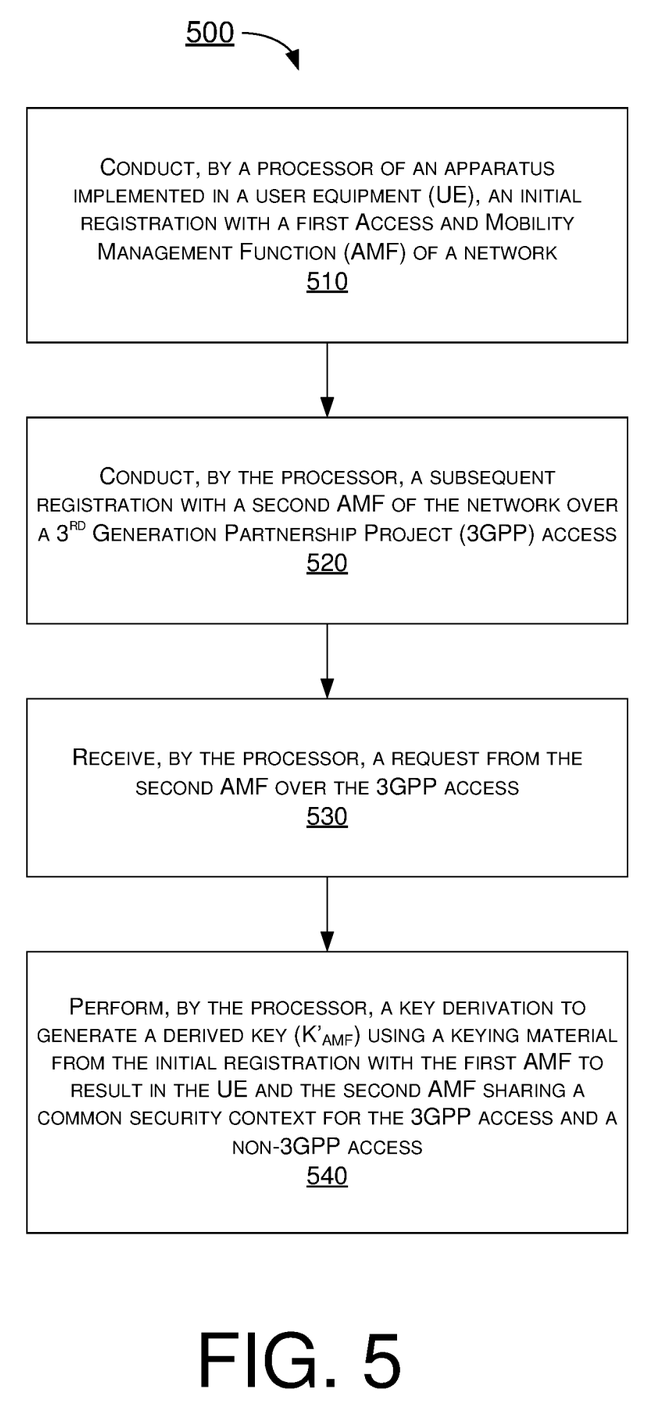
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to FIG. 1-FIG. 4. More specifically, process 500 may represent an aspect of the proposed concepts and schemes pertaining to UE key derivation at mobility update in mobile communications. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE (e.g., UE 110) and apparatus 420 as a communication entity such as a network node or base station (e.g., network node 122 or network node 126) of a wireless network (e.g., wireless network 120). Process 500 may begin at block 510.

At 510, process 500 may involve processor 412 of apparatus 410, implemented in or as UE 110, conducting, via transceiver 416, a registration with a first AMF of a network (e.g., AMF 124 of wireless network 120 as AMF 1 in network environment 100 and scenario 200). Process 500 may proceed from 510 to 520.

At 520, process 500 may involve processor 412 conducting, via transceiver 416, a registration with a second AMF of the network (e.g., AMF 128 of wireless network 120 as AMF 2 in network environment 100 and scenario 200) over a 3GPP access. Process 500 may proceed from 520 to 530.

At 530, process 500 may involve processor 412 receiving, via transceiver 416, a request from the second AMF over the 3GPP access. Process 500 may proceed from 530 to 540.

At 540, process 500 may involve processor 412 performing a key derivation to generate a derived key ($K'_{AMF}$) using a keying material from the registration with the first AMF to result in apparatus 410 and the second AMF sharing a common security context for the 3GPP access and a non-3GPP access.

In some implementations, in performing the key derivation, process 500 may involve processor 412 deriving the $K'_{AMF}$ for the 3GPP access and the non-3GPP access with respect to the second AMF In some implementations, in receiving the request, process 500 may involve processor 412 receiving a SECURITY MODE COMMAND message indicating that the key derivation is required. In an event that UE 110 used a common security context for the 3GPP access and the non-3GPP access with the first AMF, in performing the key derivation, process 500 may involve processor 412 deriving the $K'_{AMF}$ to be used with the second AMF.

In some implementations, in conducting the registration with the first AMF, process 500 may involve processor 412 registering to the first AMF over at least one of the 3GPP access and the non-3GPP access.

In some implementations, in conducting the registration with the second AMF, process 500 may involve processor 412 registering to the second AMF over the 3GPP access.

In some implementations, in conducting the registration with the second AMF, process 500 may involve processor 412 performing certain operations. For instance, process 500 may involve processor 412 detecting a movement of apparatus 410 from a first location associated with the first AMF to a second location associated with the second AMF. Additionally, process 500 may involve processor 412 performing a MOBILITY REGISTRATION procedure responsive to the detecting of the movement.

In some implementations, in performing the MOBILITY REGISTRATION procedure, process 500 may involve processor 412 performing certain operations. For instance, process 500 may involve processor 412 performing, using a common security context from the first AMF, integrity protection of an initial NAS message for the second AMF. Moreover, process 500 may involve processor 412 transmitting, via transceiver 416, the NAS message to the second AMF using a GUTI of UE 110 from the first AMF.

Figure 6:
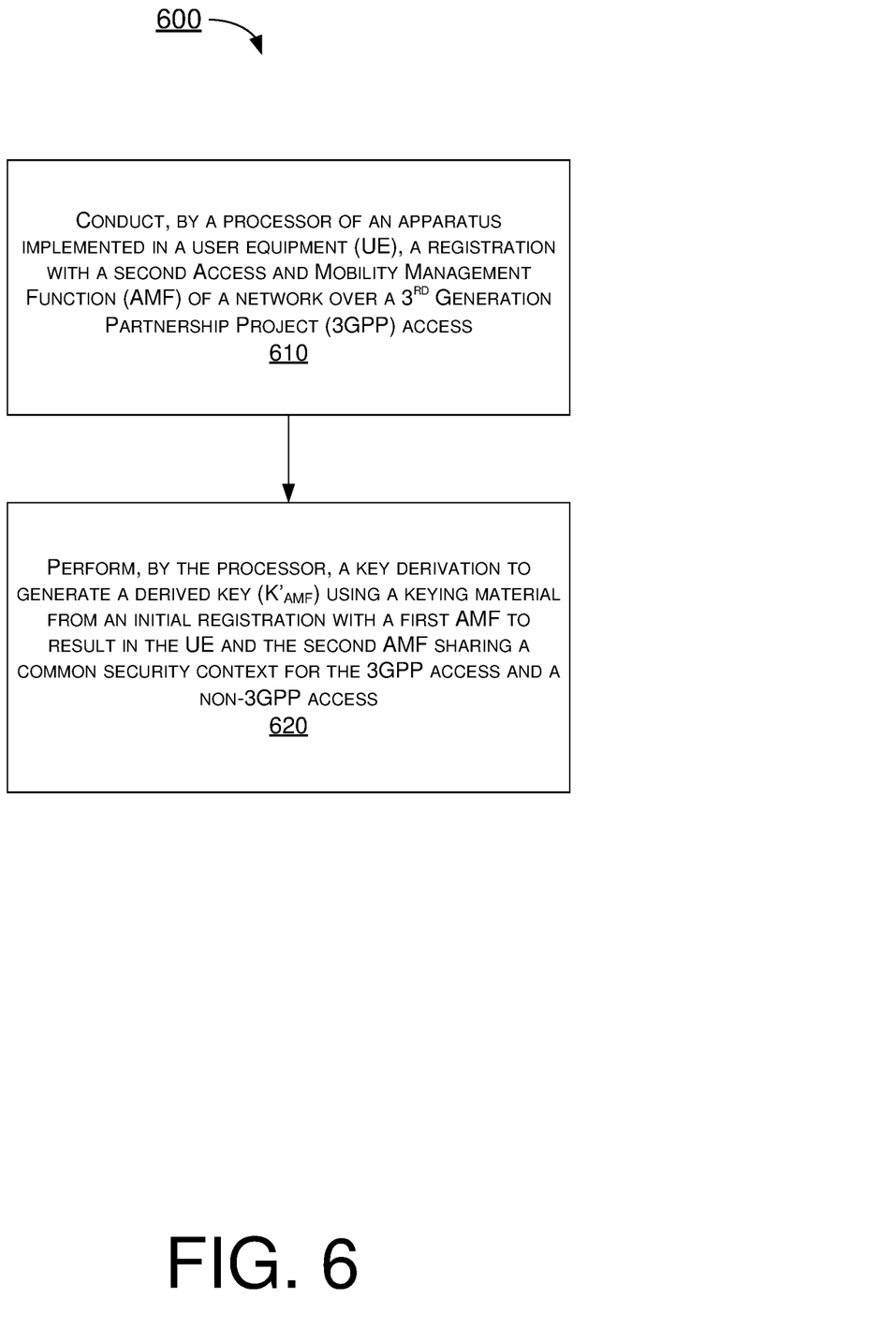
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above, whether partially or entirely, including those pertaining to FIG. 1-FIG. 4. More specifically, process 600 may represent an aspect of the proposed concepts and schemes pertaining to UE key derivation at mobility update in mobile communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed iteratively. Process 600 may be implemented by or in apparatus 410 and apparatus 420 as well as any variations thereof. Solely for illustrative purposes and without limiting the scope, process 600 is described below in the context of apparatus 410 as a UE (e.g., UE 110) and apparatus 420 as a communication entity such as a network node or base station (e.g., network node 122 or network node 126) of a wireless network (e.g., wireless network 120). Process 600 may begin at block 610.

At 610, process 600 may involve processor 412 of apparatus 410, implemented in or as UE 110, conducting, via transceiver 416, a registration with a second AMF of a network (e.g., AMF 128 of wireless network 120 as AMF 2 in network environment 100 and scenario 200) over a 3GPP access. Process 600 may proceed from 610 to 620.

At 620, process 600 may involve processor 412 performing a key derivation to generate a derived key ($K'_{AMF}$) using a keying material from an initial registration with a first AMF (e.g., AMF 124 of wireless network 120 as AMF 1 in network environment 100 and scenario 200) to result in UE 110 and the second AMF sharing a common security context for the 3GPP access and a non-3GPP access.

In some implementations, in performing the key derivation, process 600 may involve processor 412 deriving the $K'_{AMF}$ for the 3GPP access and using the $K'_{AMF}$ for the non-3GPP access with respect to the second AMF. Alternatively, or additionally, in performing the key derivation, process 600 may involve processor 412 deriving the $K'_{AMF}$ for the 3GPP access and the non-3GPP access with respect to the second AMF based on a current common security context.

In some implementations, in performing the key derivation, process 600 may involve processor 412 performing certain operations. For instance, process 600 may involve processor 412 receiving, via transceiver 416, a request from the second AMF over the 3GPP access. Additionally, process 600 may involve processor 412 performing the key derivation responsive to receiving the request. In some implementations, in receiving the request, process 600 may involve processor 412 receiving a SECURITY MODE COMMAND message indicating that the key derivation is required. In an event that UE 110 used a common security context for the 3GPP access and the non-3GPP access with the first AMF, in performing the key derivation, process 600 may involve processor 412 deriving the $K'_{AMF}$ with the second AMF.

In some implementations, in conducting the registration with the second AMF, process 600 may involve processor 412 performing certain operations. For instance, process 600 may involve processor 412 detecting a movement of apparatus 410 from a first location associated with the first AMF to a second location associated with the second AMF. Moreover, process 600 may involve processor 412 performing a MOBILITY REGISTRATION procedure responsive to the detecting of the movement.

In some implementations, in performing the MOBILITY REGISTRATION procedure, process 600 may involve processor 412 performing certain operations. For instance, process 600 may involve processor 412 performing, using a common security context from the first AMF, integrity protection of an initial NAS message for the second AMF. Additionally, process 600 may involve processor 412 transmitting, via transceiver 416, the NAS message to the second AMF using a GUTI of UE 110 from the first AMF.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implementable in mobile communications, comprising:
   conducting, by a processor of an apparatus implemented in a user equipment (UE), a registration with a first Access and Mobility Management Function (AMF) of a network;
   conducting, by the processor, one other registration with a second AMF of the network over a 3$^{rd}$ Generation Partnership Project (3GPP) access;
   receiving, by the processor, a request from the second AMF over the 3GPP access; and performing, by the processor, a key derivation to generate a derived key ($K'_{AMF}$) using a keying material from the registration with the first AMF to result in the UE and the second AMF sharing a common security context for the 3GPP access and a non-3GPP access, wherein the UE used a common security context for the 3GPP access and the non-3GPP access with the first AMF.

2. The method of claim 1, wherein the performing of the key derivation comprises deriving the $K'_{AMF}$ for the 3GPP access and using the $K'_{AMF}$ for the non-3GPP access with respect to the second AMF.

3. The method of claim 1, wherein the performing of the key derivation comprises deriving the $K'_{AMF}$ for the 3GPP access and the non-3GPP access with respect to the second AMF based on a current common security context.

4. The method of claim 1, wherein the receiving of the request comprises receiving a SECURITY MODE COMMAND message indicating that the key derivation is required.

5. The method of claim 4, wherein the performing of the key derivation comprises deriving the $K'_{AMF}$ to be used with the second AMF for 3GPP and non-3GPP accesses.

6. The method of claim 1, wherein the conducting of the registration with the first AMF comprises registering to the first AMF over at least one of the 3GPP access and the non-3GPP access.

7. The method of claim 1, wherein the conducting of the other registration with the second AMF comprises registering to the second AMF over the 3GPP access.

8. The method of claim 1, wherein the conducting of the other registration with the second AMF comprises:
   detecting a movement from a first location associated with the first AMF to a second location associated with the second AMF; and
   performing a MOBILITY REGISTRATION procedure responsive to the detecting of the movement.

9. The method of claim 8, wherein the performing of the MOBILITY REGISTRATION procedure comprises:
   performing, using a common security context from the first AMF, integrity protection of an initial Non-Access Stratum (NAS) message for the second AMF; and
   transmitting the NAS message to the second AMF using a Globally Unique Temporary Identity (GUTI) of the UE from the first AMF.

10. A method implementable in mobile communications, comprising:
    conducting, by a processor of an apparatus implemented in a user equipment (UE), a registration with a second Access and Mobility Management Function (AMF) of a network over a $3^{rd}$ Generation Partnership Project (3GPP) access; and
    performing, by the processor, a key derivation to generate a derived key ($K'_{AMF}$) using a keying material from an initial registration with a first AMF to result in the UE and the second AMF sharing a common security context for the 3GPP access and a non-3GPP access,
    wherein the UE used a common security context for the 3GPP access and the non-3GPP access with the first AMF.

11. The method of claim 10, wherein the performing of the key derivation comprises deriving the $K'_{AMF}$ for the 3GPP access and using the $K'_{AMF}$ for the non-3GPP access with respect to the second AMF.

12. The method of claim 10, wherein the performing of the key derivation comprises deriving the $K'_{AMF}$ for the 3GPP access and the non-3GPP access with respect to the second AMF based on a current common security context.

13. The method of claim 10, wherein the performing of the key derivation comprises:
    receiving a request from the second AMF over the 3GPP access; and
    performing the key derivation responsive to receiving the request.

14. The method of claim 13, wherein the receiving of the request comprises receiving a SECURITY MODE COMMAND message indicating that the key derivation is required.

15. The method of claim 14, wherein the performing of the key derivation comprises deriving the $K'_{AMF}$ to be used for the non-3GPP access and the 3GPP access with the second AMF.

16. The method of claim 10, wherein the conducting of the registration with the second AMF comprises:
    detecting a movement from a first location associated with the first AMF to a second location associated with the second AMF; and
    performing a MOBILITY REGISTRATION procedure responsive to the detecting of the movement.

17. The method of claim 16, wherein the performing of the MOBILITY REGISTRATION procedure comprises:
    performing, using a common security context from the first AMF, integrity protection of an initial Non-Access Stratum (NAS) message for the second AMF; and
    transmitting the NAS message to the second AMF using a Globally Unique Temporary Identity (GUTI) of the UE from the first AMF.

18. An apparatus implemented as a first user equipment (UE), comprising:
    a transceiver configured to wirelessly communicate with a wireless network; and
    a processor coupled to the communication device and configured to perform operations comprising:
      conducting, via the transceiver, a registration with a second Access and Mobility Management Function (AMF) of a network over a $3^{rd}$ Generation Partnership Project (3GPP) access; and
      performing a key derivation to generate a derived key ($K'_{AMF}$) using a keying material from an initial registration with a first AMF to result in the UE and the second AMF sharing a common security context for the 3GPP access and a non-3GPP access,
    wherein the UE used a common security context for the 3GPP access and the non-3GPP access with the first AMF, and
    wherein, in performing the key derivation, the processor is configured to derive the $K'_{AMF}$ to be used for the non-3GPP access and the 3GPP access with the second AMF.

19. The apparatus of claim 18, wherein, in performing the key derivation, the processor is configured to derive the $K'_{AMF}$ and using the $K'_{AMF}$ for the non-3GPP access and for the 3GPP access with respect to the second AMF.

20. The apparatus of claim 18, wherein the UE used a common security context for the 3GPP access and the non-3GPP access with the first AMF, and wherein, in performing the key derivation, the processor is configured to perform operations comprising:
    receiving a request from the second AMF over the 3GPP access; and
    performing the key derivation to derive the $K'_{AMF}$ responsive to receiving the request and taking it in use for 3GPP access and for non-3GPP access, wherein the request comprises a SECURITY MODE CONTROL command indicating that the key derivation is required.

\* \* \* \* \*